United States Patent [19]
Briotet et al.

[11] 3,719,047
[45] March 6, 1973

[54] CONTROL DEVICES FOR GAS TURBINE POWER PLANTS

[75] Inventors: Jean Paul Francois Gilbert Briotet, Le Mee-sur-Seine; Armand Ravagli, Ivry, both of France

[73] Assignee: Societe Nationale D'Etude et de Construction de Monteurs d'Aviation, Paris, France

[22] Filed: Feb. 3, 1971

[21] Appl. No.: 112,272

[30] Foreign Application Priority Data

Feb. 4, 1970 France.................................7003923

[52] U.S. Cl.................................60/239, 60/39.09 R
[51] Int. Cl................................................F02k 11/00
[58] Field of Search..60/235, 236, 238, 239, 39.09 R

[56] References Cited

UNITED STATES PATENTS

| 2,874,540 | 2/1959 | Esmeier | 60/39.09 R |
| 2,933,887 | 4/1960 | Davies | 60/236 |
| 3,023,575 | 3/1962 | Haase | 60/39.09 R |
| 3,232,053 | 2/1966 | Rogers | 60/238 |
| 3,300,979 | 1/1967 | Aubert | 60/237 |
| 3,312,057 | 4/1967 | Tissier | 60/238 |

*Primary Examiner*—Douglas Hart
*Attorney*—William J. Daniel

[57] ABSTRACT

A control device for a gas turbine power plant of the type comprising a compressor, a combustion chamber supplied with air coming from the compressor and with fuel, a turbine supplied with combustion gases coming from the combustion chamber, and a nozzle which discharges the combustion gases coming from the turbine, said control device comprising means for metering the fuel flow to the combustion chamber and means for varying the cross-sectional area of the nozzle, wherein the means for varying the cross-sectional area of the nozzle is controlled as a function of the fuel flow rate C delivered to the combustion chamber, the static air pressure $P_{s_4}$ at exit from the compressor, and the static gas pressure $P_{s_7}$ at the turbine exit, so that at least under certain conditions of operation, an output quantity defined by the expression $C/(\beta P_{s_4} - P_{s_7})$, in which $\beta$ designates a constant coefficient of reduction, has a desired predetermined value.

12 Claims, 3 Drawing Figures

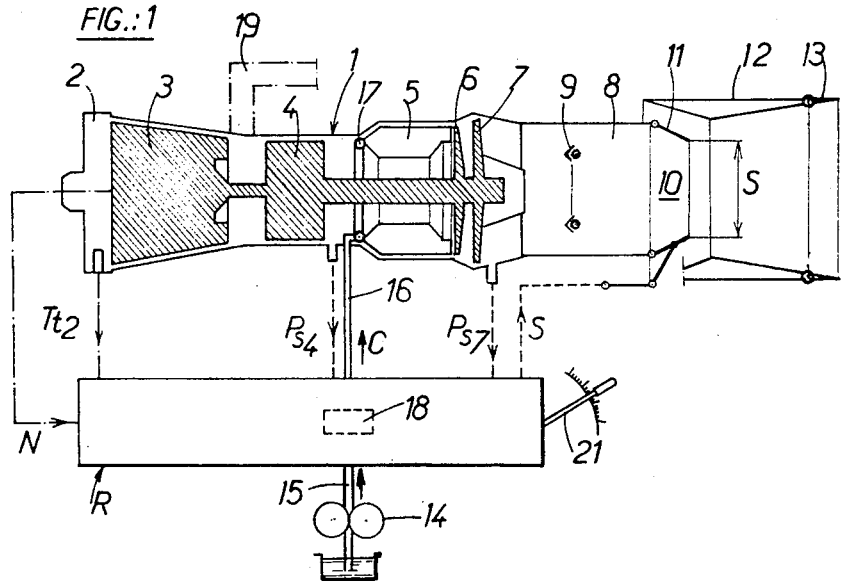
FIG.:1
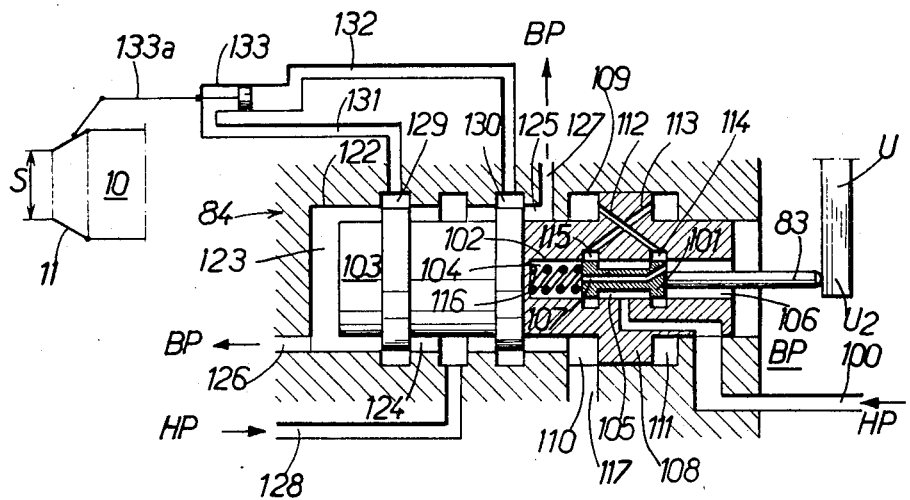
FIG.:3

CONTROL DEVICES FOR GAS TURBINE POWER PLANTS

The present invention relates to a control device for a gas turbine power plant, in particular for aircraft jet propulsion applications, of the type comprising a compressor, a combustion chamber supplied with air coming from the compressor and with fuel, a turbine supplied with combustion gases coming from the combustion chamber, and a nozzle which discharges the combustion gases coming from the turbine, said device comprising means for metering, i.e., regulating, the fuel flow to the combustion chamber and means for varying the cross sectional area of the nozzle.

The object of the invention is to improve existing control devices both from the point of view of their flexibility and reliability and from that of their performance.

As those skilled in the art will be aware, for a given compressor speed, there is a relationship between the cross-sectional area of the nozzle and the gas temperature at the turbine intake, which makes it possible to control said temperature by varying said cross sectional area. This kind of control, in particular, makes it possible to compensate for the substantial variations to which said temperatures is subject when external conditions such as the speed and altitude of an aircraft propelled by the gas turbine power plant, vary, and also makes it possible to maintain this temperature at a selected value so that the highest possible efficiency is achieved at all times whilst being compatible with the temperature which the turbine blading will withstand.

However, difficulties arise in accurately determining by direct measurement, the temperature of the gases at the turbine intake, these difficulties arising in particular from the non-uniformity of the thermal field and the thermal inertia of the temperature detecting device. Also, various devices have been proposed in which said direct measurement is replaced by an indirect measurement in the form of the production of a signal which takes account of the instantaneous values of various factors which could influence said temperature, in accordance with a theoretical or experimental law.

The present invention falls within the scope thus defined, i.e., comes under the heading of the case in which the temperature of the gases, measured indirectly, is regulated by varying the nozzle cross-sectional area and it relates, in a first aspect, to the definition of a control law which, in a simple but nevertheless more accurate fashion than the known laws, expresses the reality of the physical phenomena which are at work.

To this end, in accordance with this aspect of the invention and in a control device of the kind above described, the means for varying the cross-sectional area of the nozzle is controlled as a function of the fuel flow rate C delivered to the combustion chamber, the static air pressure $P_{s_4}$ at exit from the compressor, and the static gas pressure $P_{s_7}$ at the turbine exit, so that at least under certain conditions of operation, an output quantity defined by the expression $\frac{C}{\beta P_{s_4} - P_{s_7}}$, in which $\beta$ designates a constant coefficient of reduction, has a desired predetermined value. As will be seen hereinafter, said predetermined value can be adjusted for example as a function of the position of a pilot-operated control lever in the aircraft, in order to take account of the load and possibly of other parameters associated with the power plant.

The law of control thus chosen has various practical advantages, in particular when applied to a dual-flow power plant with an after-burner fitted. Amongst these advantages we can point in articular to a considerable improvement in the accuracy of the indirect control of the gas temperature upstream of the turbine (and therefore to a corresponding increase in the power plant efficiency by reason of reduction in the safety margin which has been necessary hitherto), an increase in the sensitivity to load variations during operation in the after-burning configuration (and consequently reduction in the acceleration and deceleration times in said configuration), and, in the case of a dual-flow power plant, a reduced sensitivity to the tapping off of air and power from the secondary duct of the power plant.

As explained in detail hereinafter, the control device in accordance with the invention comprises means by which to produce, as a function of the fuel flow-rate C delivered to the combustion chamber and the static pressures first of all $P_{s_4}$, of the air at the exit from the compressor and secondly $P_{s_7}$ of the gases at the exit from the turbine, a first signal which is a function of the output quantity $\left[\frac{C}{\beta P_{s_4} - P_{s_7}}\right]$; means for producing a second signal or reference signal $\left[\frac{C}{\beta P_{s_4} - P_{s_7}}\right]^*$ which is a function of said desired predetermined value ; means for producing a third signal or error signal which is a function of the difference $\left[\frac{C}{\beta P_{s_4} - P_{s_7}}\right]$ minus $\left[\frac{C}{\beta P_{s_4} - P_{s_7}}\right]^*$ ; and means sensitive to said error signal in order to control the variation in the cross-sectional area of the nozzle.

The implementation of these various means obviously requires proper operation of an automatic signal-processing device, for example an electronic device. Serious consequences as far as the thermal integrity of the turbine blading is concerned, could therefore result from a break-down or failure in said processing device.

Thus, in accordance with a second aspect, the invention provides for the limitation of the damage which could arise from such a failure, by simple and efficient emergency manual control (which could also be implemented in order to back up automatic temperature control of a different kind to that described hereinbefore), which has the feature of using, as control factor, the fuel flow rate supplied to the combustion chamber.

In accordance with one arrangement which is concerned with this aspect of the invention, the means used to regulate the fuel flow to the combustion chamber are controlled as a function of the fuel flow-rate C delivered to said combustion chamber and of the static pressure $P_{s_4}$ of the air at the compressor exit, so that an output quantity defined by the ratio $\frac{C}{P_{s_4}}$ is maintained at a predetermined desired value which can be modified through the agency of the manual emergency control referred to hereinbefore. It is thus possible, within certain limits fixed by the range of operation of the pilot-operated control lever, to vary the value of the ratio $\frac{C}{P_{s_4}}$. To each value of this ratio, there then corresponds a gas turbine power plant working point with an approximately constant gas temperature at the turbine intake.

In accordance with an advantageous arrangement, a disengageable coupling can be arranged between the emergency manual control and the means used to regulate the fuel flow rate, in order, in normal operation, to eliminate any interference between the manual control and the automatic control. This coupling can, for example, be biased into its engaged position under the action of the pressure of a control fluid, said action being consequent upon the opening of a valve device arranged between a source of said control fluid and the coupling.

In accordance with another feature of the invention, means can be provided in order to urge into their fully open position, the means used to vary the cross-sectional area of the nozzle, this when said coupling is in the engaged position, that is to say when the emergency control system is in operation. In this fashion, possible inopportune variations in the cross-sectional area of the nozzle, which, despite the intervention of the emergency control, could give rise to a dangerous increase in the gas temperature at the turbine intake, are avoided.

In accordance with a preferred embodiment of the invention, these urging means can comprise means sensitive to the pressure of the coupling control fluid, said pressure being tapped off between said coupling and the valve device.

The description which now follows in relation to the attached drawings, given here by way of a non-limitative example, will indicate how the invention may be put to effect.

FIG. 1 is a much simplified view of a gas turbine power plant equipped with a control device in accordance with the invention;

FIG. 3 is a view on a larger scale, of a detail of FIG. 2.

Figure 2:
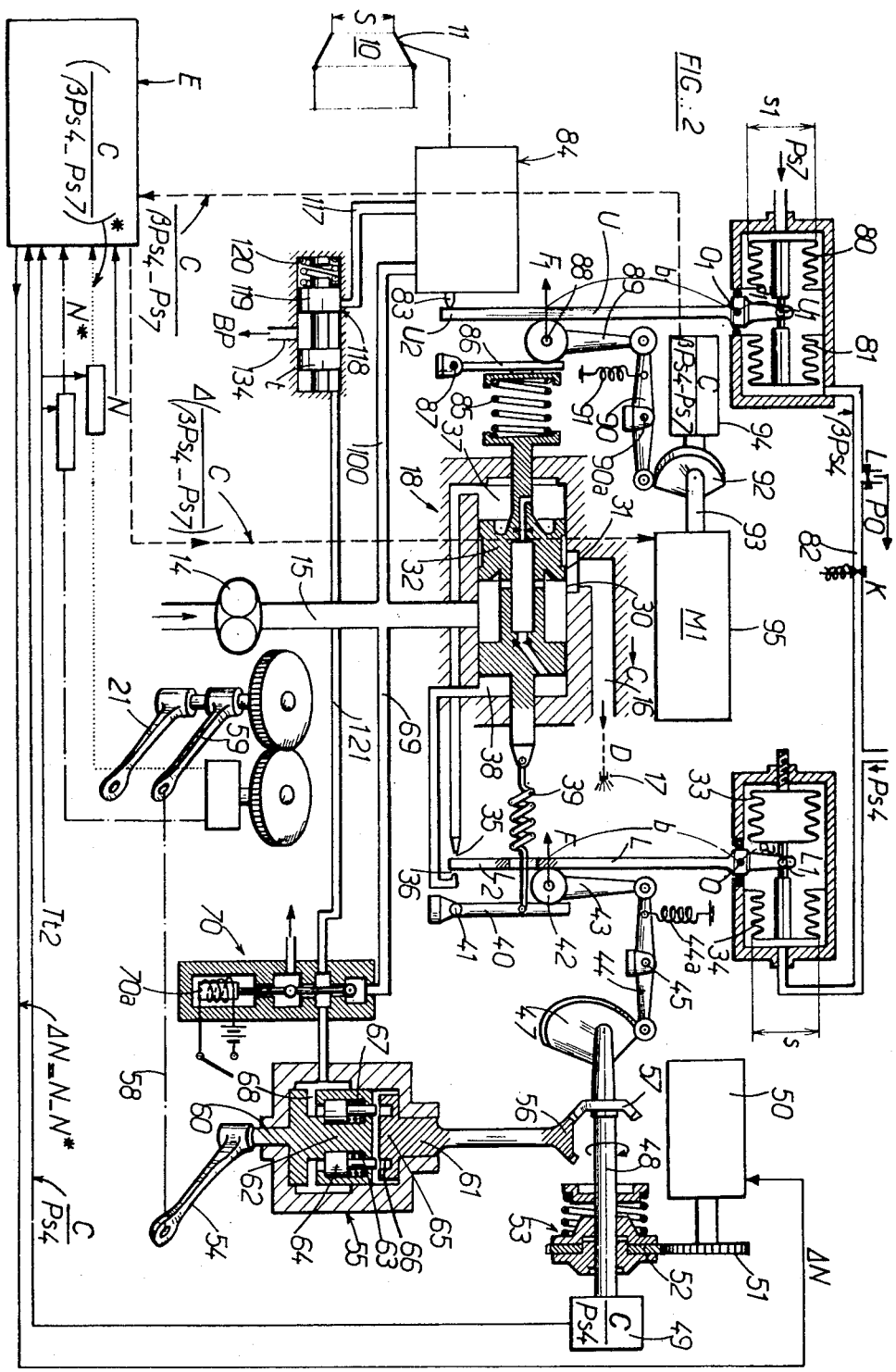
FIG. 2 is a schematic view of said control device.

In FIG. 1, the general reference 1 has been used to indicate a gas turbine power plant constituted in the present case by a basic turbojet engine designed for the propulsion of a flying machine such as an aircraft. Said turbojet engine comprises following an air-intake 2, a compressor with a low-pressure section 3 and a high-pressure section 4, a combustion chamber 5, a turbine constituted by a high-pressure stage 6 and a low-pressure stage 7, an after-burner section 8 with burners 9, and a nozzle 10 for discharging the combustion gases, these latter possibly being re-heated in the after-burner section 8 on exit from the turbine.

Means such as flaps 11, enable the cross-sectional area of the nozzle 10, which we shall mark by the letter S, to be varied. As those skilled in the art will be aware, the nozzle 10 can cooperate with a secondary convergent-divergent fairing 12 terminated in secondary controllable flaps 13. The combustion chamber 5 is supplied with air from the compressor and with fuel from a pump 14 through pipes 15, 16 and injectors 17. Means 18, arranged between the pipes 15 and 16 make it possible to control the effective flow rate which we will her designate by C, of the fuel delivered to the combustion chamber 5. These means can advantageously comprise a variable-area orifice associated with means for maintaining the fuel pressure drop across said orifice, constant.

The turbojet engine 1 can be of the single-flow or dual-flow kind, this being symbolized by the presence of a branch duct 19, illustrated in chain-dotted fashion, coupled to the output of the low-pressure stage 3 of the compressor and enabling a certain proportion of the air delivered by said stage to be tapped off.

A pilot-operated control lever 21 enables the pilot to vary the power plant load continuously. This control lever is associated with a control device marked by the general reference R which constitutes the object of the present invention. Said control device is designed, for each position to which the pilot sets his control lever to ensure optimum operation of the power plant and eliminate mechanical and thermal conditions which could adversely affect its stability and operational life, this whatever the disturbances (such as variations in atmospheric conditions or changes in altitude or speed of flight of the aircraft) to which it is subjected.

To this end, it reacts to various signals and as a consequence modifies two control quantities constituted respectively by the fuel flow rate C delivered into the combustion chamber 5 and the cross-sectional area S of the nozzle 10. These signals include, in particular signals representing the static air pressure at the compressor exit (which we will subsequently call $P_{s_4}$), the static gas pressure at the turbine exit (which we shall subsequently call $P_{s_7}$), the speed of rotation of the compressor (which we shall subsequently call N), the total temperature of the air at the compressor intake (which we shall subsequently call $T_{t2}$), and scheduled signals which are a function, in particular, of the position of the pilot-operated lever 21.

Considering FIGS. 2 and 3, the control device R in accordance with the invention will now be described.

The fuel circuit comprises, as we have seen, means 18 for metering the effective fuel flow rate C to the combustion chamber, said means being arranged between the pump 14 and the injectors 17. Said means comprise a metering orifice 30 constituted by an opening whose exposed cross-sectional area varies, preferentially linearly as a function of the position of a spool 31 fixed to a servo piston 32. Means such as a control valve, which has not been shown, enable the pressure drop of the fuel through the metering orifice 30 to be maintained constant so that the fuel flow rate C is itself a linear function of the position of the servo piston 32.

The control of the fuel flow rate is effected by means of a force balance in the form of a lever L articulated at a fixed point O. At one of the ends $L_1$ of said lever, there acts at a moment arm $a$ from the fulcrum O, a force which is generated in a system comprising a capsule 33 which is evacuated and a capsule 34 subjected to the static pressure $P_{s_4}$ of the air delivered by the compressor, said force being thus proportional to the absolute pressure $\bar{P}_{s_4}$. The other end $L_2$ of the lever oscillates very slightly between two bleed openings 35, 36 and, as a consequence of its movement, modulates in one direction or the other the pressures prevailing in two chambers 37, 38 delimited respectively by the opposite faces of the servo piston 32 and supplied in each case with fuel under pressure.

To servo piston 32 is attached by a spring 39 to a lever 40 articulated at a fixed point 41. A roller 42 can move between the lever L and the lever 40 without losing contact with said two levers, whatever the position of the end $L_2$ of the lever L between the bleed openings 35, 36. The amplitude of oscillation of the lever L being very small, it is reasonable to assume that its displacement is perpendicular to the travel of the servo piston 32.

The roller 42 is secured to a link 43 articulated at one of its ends to a lever 44 pivoting about a fixed point 45. The other end of the lever 44 bears under the action of a spring 44a against a cam 47 fixed to a rotating shaft 48.

Thus, a relationship can be established between the angular position of the shaft 48 and the position of the roller 42, which position can be defined by the distance $b$ separating said roller from the fulcrum O.

The spring 39 exerts upon the lever L, through the medium of the lever 40 and the roller 42, a force F proportional to the tension in said spring. If we call $s$ the cross-sectional area of the capsules 33, 34, then the lever, in the balanced condition, adopts an angular position such that the following balanced equation obtains:

$$P_{s_4} \cdot s \cdot a = F \cdot b$$

from which we obtain $$\frac{F}{P_{s_4}} = s \cdot \frac{a}{b}$$

The quantities $a$ and $s$ being constant, the result is that the ratio $\frac{F}{P_{s_4}}$ is a function purely of the distance $b$, that is to say of the position of the roller 42. For a given position of said roller, the ratio $\frac{F}{P_{s_4}}$ is therefore constant. The lever L and the roller 42 thus define a balanced system of forces with a variable multiplication ratio which is a function of the angular position of the shaft 48.

If the spring 39 is selected so that its tension varies linearly with its extension, that is to say with the displacement of the servo piston 32, then the quantities $F$ and $C$ will be proportional and we can therefore write:

$$\frac{C}{P_{s_4}} = \text{constant}$$

for a given angular position of the shaft 48.

This angular position can be detected by a pick-up 49 which produces for example an electrical signal which is a function of said angular position and, consequently, of the value of the ratio $\frac{C}{P_{s_4}}$ corresponding thereto. Two controls, one automatic and the other manual, enable the angular position of the shaft 48 to be modified.

The automatic control essentially comprises a motor 50, for example an electric one, coupled to the shaft 48 through the medium of gears 51, 52 and a torque-limiter 53.

The manual control comprises a lever 54 coupled on the one hand with the shaft 48 through the medium of a disengageable coupling 55, and bevel gears 56, 57, and on the other hand to the pilot-operated lever 21 through the medium of a linkage 58, 59.

The disengageable coupling 55 comprises, in particular, a drive shaft 60 driven by the lever 54, and a driven shaft 61 fixed to the gear 56. The drive shaft 60 is fixed to a component 62 in which there are slidably mounted fingers 63 each exhibiting a shoulder 64. The driven shaft 61 is fixed to a plate 65 in which slots 66 of shape corresponding to that of the fingers 63, are provided. The said fingers can occupy two positions, namely an operative position or engaged position, in which they penetrate into the slots 66 in order to couple the drive shaft 60 and the driven shaft 61, and an inoperative or disengaged position, in which they are retracted by return springs 67, into the interior of the component 62.

Each of the shoulders 64 can be subjected to the pressure of a control fluid which is admitted to a chamber 68 within the coupling. In the example illustrated, said control fluid is constituted by pressurized fuel tapped off upstream of the metering means 18, through the medium of a pipe 69 in which a valve device is arranged, in the present instance a solenoid valve 70. The latter is normally maintained in the closed position by the action of the fuel pressure prevailing in the pipe 69, but is open when its electrical circuit, indicated by reference 70a, is switched in.

In normal operation, it is exclusively the automatic control 50, 51, 52, 53 which is operative and the coupling 55 is disengaged. The manual control 54, 55, 56, 57 is an emergency control whose function will be explained hereinafter.

The automatic control 50, 51, 52, 53 forms part of a first control system in which the control quantity or parameter is constituted by the ratio $\frac{C}{P_{s_4}}$ (the value of which is represented by the position of the roller 42 that is to say the angular position of the shaft 48), and in which the output quantity or controlled parameter is the speed of rotation N of the compressor.

A computer device E, for example an electrical or electronic device, is supplied to this end with a first signal which is a function of the actual speed of rotation N of the compressor as detected by a suitable tachometer, and a second signal $N^*$ representing a desired speed as set by the angular position of the pilot-operated lever 21 and possibly corrected by other parameters such as the total temperature $T_{t_2}$ of the compressor intake air in order, for example, to take account of the altitude of flight. The device E produces, on the basis of these signals, an error signal $\Delta N = N - N^*$ which, through the medium of the electric motor 50, controls the angular position of the shaft 48 in a proportional manner $[\Delta \left(\frac{C}{P_{s_4}}\right) = \lambda \Delta N$, $\lambda$ being a constant] or a time-integrating manner $[\frac{C}{P_{s_4}} = \mu \int \Delta N \cdot dt$, $t$ being the time and $\mu$ being another constant].

A negative feedback signal which is a function of the instantaneous value of the ratio $\frac{C}{P_{s_4}}$ detected by the pick-up 49, can also be supplied to the computer E.

As long as the error $\Delta N$ persists, the motor 50 rotates the shaft 48 which, through the medium of the cam 47 and levers 44 and 43, produces displacement of the roller 42. In the equilibrium condition, the ratio $\frac{C}{P_{s_4}}$ is adapted to the desired speed of rotation and the exposed cross-sectional area of the metering orifice 30 is such as to pass the fuel flow rate C which corresponds to this speed.

In the known fashion, acceleration and deceleration stops (not shown) can be provided in the computer device E in order to limit the value of $\frac{C}{P_{s_4}}$ as a function of parameters such as N or $P_t$ (total pressure of the compressor intake air).

When the emergency control 54, 55, 56, 57 is operated, its action overrides that of the automatic control 50, 51, 52, 53 by reason of the presence of the torque limiter 53 whose setting is appropriately calculated.

To the first control system described, a second is added in which the control quantity or parameter is constituted by the cross-sectional area S of the nozzle 10 and in which the controlled parameter is constituted, in accordance with one feature of the invention, by a special output quantity defined by the expression $\frac{C}{\beta P_{s_4} - P_{s_7}}$, in which C designates the fuel flow rate injected into the combustion chamber 5, $\overline{P_{s_4}}$ the static air pressure at the compressor exit $P_{s_7}$, the static gas pressure at the turbine exit, and $\beta$ a predetermined numerical coefficient less than one.

The applicants have come to consider that this quantity constitutes an indirect but extremely accurate indication of the temperature $T_{t5}$ of the combustion gases at the turbine intake, which temperature it is the object of the control system hereinafter described to maintain, under all conditions of operation of the power plant, at an optimum value which does not introduce any risk of impairment of the thermal stability of the turbine blading.

A force balances system constituted by a lever U with a variable multiplication ratio, articulated about a fixed fulcrum point $O_1$, enables a signal which is a function of the quantity $\frac{C}{\beta P_{s_4} - P_{s_7}}$, to be generated. At one of its ends $U_1$, this lever is acted upon, at a moment arm $a_1$ from the fulcrum $O_1$, by a force generated in a system comprising two opposed capsules of the same cross-sectional area, namely a first capsule 80 subjected to the pressure $P_{s_7}$ and a capsule 81 subjected to a lower pressure $\beta P_{s_4}$. This latter pressure is produced, from the pressure $P_{s_4}$, in a reducer device comprising a chamber 82 communicating on the one hand with the downstream side of the compressor through the medium of a restrictor K, preferably a variable one, and on the other hand, with the atmosphere (where a pressure $P_o$ prevails), through the medium of a restrictor L, for example a fixed one.

The other end $U_2$ of said lever cooperates with a rod 83 forming part of a servo control 84 designed to regulate the cross-sectional area S of the nozzle 10, the detail of said servo control having been shown in FIG. 3.

The servo piston 32 forming part of the fuel-metering means 18, acts through the medium of a spring 85 on a lever 86 articulated at a fixed point 87. A roller 88 can displace between the lever U and the lever 86 without losing contact with either of them, this whatever the position of the end $U_2$ of the lever U which cooperates with the rod 83.

The roller 88 is fixed to a link 89 articulated to one of the ends of a lever 90 pivoting about a fixed fulcrum point 90a. The other end of the lever 90 bears under the action of a spring 91 against the cam 92 fixed to a rotatable shaft 93. Thus, as in the case of lever L described earlier, a relationship can be established between the angular position of the shaft 93 and the position of the roller 88, which position can be defined by the distance $b_1$ separating said roller from the fulcrum point $O_1$.

The spring 85 exerts upon the lever U, through the medium of the lever 86 and the roller 88, a force $F_1$ which is proportional like the force F exerted upon the lever L, to the fuel flow rate C.

In the equilibrium condition, the lever U adopts an angular position such that the following balanced equation obtains:

$$(\beta P_{s_4} - P_{s_7}) \cdot s_1 \cdot a_1 = F_1 \cdot b_1$$

$s_1$ designating the cross-sectional area of the capsules 80 and 81 from which we obtain:

$$\frac{F_1}{\beta P_{s_4} - P_{s_7}} = s_1 \cdot (a_1/b_1)$$

As the quantities $a_1$ and $s_1$ are constant, the expression $\frac{F_1}{\beta P_{s_4} - P_{s_7}}$ is solely a function of the distance $b_1$ defining the position of the roller 88. The lever U and the roller 88 thus define a force balance system with a multiplication ratio varying as a function of the angular position of the shaft 93. Because of the fact that the quantities $F_1$ and C are proportional, we can therefore write:

$$\frac{C}{\beta P_{s_4} - P_{s_7}} = \text{constant}$$

for a given angular position of the shaft 93.

This angular position can be detected by means of a pick-up 94 which generates a signal, for example an electrical one, which is a function of said angular position and, consequently, of the value of the quantity $\frac{C}{\beta P_{s_4} - P_{s_7}}$ corresponding thereto. Said signal is supplied to the computer device E where it is compared with a second signal representing a desired value of $\left[\frac{C}{\beta P_{s_4} - P_{s_7}}\right]^*$ said quantity, which value is set by the angular position of the pilot-operated control lever 21 (possibly corrected, as before, for example as a function of $T_{t2}$ in order to obtain a temperature $T_{t5}$ which is strictly constant).

An error signal $\Delta \left[\frac{C}{\beta P_{s_4} - P_{s_7}}\right]$ is then generated and supplied to a motor 95, for example an electric motor, which rotates until the position of the roller 88 cancels said signal out. The equilibrium condition of the lever U is thus established and the cross-sectional area S of the nozzle, controlled by the rod 83, is then such that the quantity $\frac{C}{\beta P_{s_4} - P_{s_7}}$ (and, ultimately, the temperature $T_{t5}$), is maintained at the set value.

Considering now, FIGS. 2 and 3, the servo control system 84 designed to regulate the cross-sectional area of the nozzle 10, will be described. This servo control is of the two-stage hydraulic type and utilizes as the working fluid, at least in the first stage, the pressurized fuel tapped off, prior to metering, from the pipe 15 by means of a high-pressure pipe 100.

The rod 83, referred to hereinbefore and cooperating with the force balance system U, is fixed to a first spool 101 sliding in a cylinder 102 formed in a second spool 103. The spool 101, in cooperation with the cylinder 102, defines three chambers 104, 105, 106. The terminal chambers 104 and 106 are connected with one another through a passage 107 and with a low-pressure space BP. The central chamber 105 communicates with the high-pressure line 100. The spool 103 is integral with a shoulder 108 forming a piston sliding in a cylinder 109. The piston 108 delimits, in cooperation with the cylinder 109, two chambers 110, 111 which communicate through respective passages 112, 113 with openings 114, 115 formed in the wall of the cylinder 102. The rod 83 which is integral with the spool 101 is maintained constantly in contact with the lever U under the action of a spring 116.

There also extends from chamber 110 a line 117 terminating in a hydraulically operated valve device 118 (see FIG. 2). This valve device comprises, in particular, a spool 119 biased in the closing direction by a spring 120 and urged in the opening direction by the pressure of a control fluid. The latter can advantageously be constituted by the pressurized fuel tapped off, through a line 121, between the valve device 70 and the disengageable coupling 55. In the configuration illustrated in FIG. 2, the valve device 70 is closed. In this configuration, the valve device 118 is subjected to the action of the spring 120 only, and is thus also closed.

The spool 103 slides in a cylinder 122, cooperating therewith to delimit three chambers 123, 124, 125. The two terminal chambers 123, 125 communicate through lines 126 and 127 with a low-pressure space BP whilst the central chamber 124 is connected through a line 128 to a high-pressure fluid source HP. Openings or ports 129, 130 formed in the wall of the cylinder 122 communicate respectively, through the medium of lines 131, 132, with two chambers of at least one double-acting ram 133 designed to operate the flaps 11 of the nozzle. The reference 133a has been used to designate the moving element or rod of the ram or jack.

In the configuration of FIG. 3, the spool 101 is in a central position in which it closes off the ports 114, 115. The piston 108 and, consequently, the spool 103 then likewise adopt a central position in which the ports 129, 130 are closed off this immobilizing the rod 133a of the ram and thus that of the flaps 11, in a position which defines a certain cross-sectional area S in the nozzle.

In the event of imbalance of the force balance system U, the rod 83 acts in an appropriate direction upon the spool 101 producing a displacement, in the same direction of the spool 103 at a rate which is a function of the position of the spool 101 in relation to the ports 114, 115, that is to say of the amplitude of the imbalance in the system U, the central position of the spool 101 corresponding to the stationary condition in the spool 103 (the system is referred to as having an "integral" response). The pressurized fluid coming from the line 128 then penetrates one or the other of the two working spaces of the ram 133 in order to produce the desired variation in the cross-sectional area of the nozzle.

The mode of operation just described, of the servo control system 84 for operating the nozzle flaps, is valid only for the case where the valve device 118 is in the closed position. In the opposite case, the line 117 communicates through the medium of a line 134, with a low-pressure space BP so that the spool 103 comes up against the left-hand stop (see FIG. 3). The flaps 11 then take up their fully open position in which the cross-sectional area of the nozzle 10 is maintained at its maximum value whatever the position of the force balance system U.

In normal operation, the computer device E simultaneously generates a first error signal $\Delta N$ and a second error signal $\Delta \left[ \dfrac{C}{\beta P_{a_4} - P_{a_7}} \right]$. The first error signal controls, in automatic fashion as we have seen, the value of the control parameter $\dfrac{C}{P_{a_4}}$ in order to effect control of speed, whilst the second acts upon the cross-sectional area of the nozzle 10 in order to effect control of the temperature $T_{t5}$, said temperature being represented by the quantity $\dfrac{C}{\beta P_{a_4} - P_{a_7}}$.

The choice of this quantity, in accordance with one of the features of the invention, to represent the temperature $T_{t5}$ is an advantageous one since it makes it possible simultaneously to increase the accuracy of control and also its sensitivity, in particular to the cutting-in of the after-burner. The control of the cross-sectional area of the nozzle during acceleration phases, in particular in the afterburning configuration, is much more rapid whilst disturbances in the speed of rotation are reduced. In a general way, acceleration times are considerably shortened. In addition, the effect upon the control system of possible variations in the Reynolds number of the flow or of tapping off of air or power (for example in the case of a dual-flow turbojet engine, through the by-pass 19 shown in FIG. 1), is drastically reduced.

In the event of failure of the computer device E or any of the elements of the system which controls the temperature by acting upon the cross-sectional area of the nozzle, there is provided in accordance with another aspect of the invention an emergency control system based upon direct manual control of the ratio $\dfrac{C}{P_{a_4}}$.

To this end, the pilot effects the opening of the valve device 70 by switching in the electrical circuit 70a. The pressurized fuel coming from the line 69 then, on the one hand controls the engagement of the coupling 55 and, on the other, through the medium of line 121, effects the opening of the valve device 118.

Because of the engagement of the coupling 55, the movements of the pilot-operated lever 21 are transmitted directly to the shaft 48. The pilot is thus able to vary, within certain limits fixed by the range of deployment of the lever 21 and without exceeding the stabilized operating range of the power plant, to vary the value of the ratio $\dfrac{C}{P_{a_4}}$. To each of the values of this ratio (and it will be noted that said ratio can be generated with very high accuracy), there corresponds a working point with a temperature $T_{t5}$ which is maintained at an approximately constant safe value. Self-evidently, the torque-limiter 53 is set so that the intervention of the pilot overrides the automatic control 50, 51, 52, 53. In addition, the opening of the valve device 118 results in the nozzle flaps 11 moving into their maximum aperture position and being maintained there. This arrangement constitutes a safety measure which, when the emergency control system is operating, avoids inopportune variations in the temperature $T_{t5}$ consequent upon uncontrolled variations in the cross-sectional area of the nozzle.

Thus, by utilizing certain elements of an existing automatic control system and without further complicating the power plant other than by the addition of simple elements (disengageable coupling 55, valve devices 70 and 118, torque-limiter 53), a particularly reliable and effective emergency control (direct control) is created. This emergency control could also, if required, be supplemented by an automatic temperature control system of another kind than the one specifically described hereinbefore.

It goes without saying that the embodiments described are merely examples and are open to modification, in particular by the substitution of equivalent techniques, without in so doing departing from the scope of the invention.

We claim:

1. In and for a gas turbine power plant which comprises a compressor, a combustion chamber supplied with air coming from the compressor and with fuel, a turbine supplied with combustion gases coming from the combustion chamber, and a nozzle for discharging the combustion gases coming from the turbine, an improved device comprising:

means for regulating the fuel flow to the combustion chamber;

means for varying the cross-sectional area of the nozzle; and means for controlling the nozzle cross-sectional area varying means as a function of the fuel flow rate C delivered to the combustion chamber, the static air pressure $P_{s4}$ at exit from the compressor, and the static gas pressure $P_{s7}$ at the turbine exit, so that at least under certain conditions of operation, an output quantity defined by the expression $\frac{C}{\beta P_{s4}-P_{s7}}$, in which $\beta$ designates a constant coefficient of reduction, has a desired predetermined value.

2. A control device as claimed in claim 1, comprising means for producing as a function of the fuel flow rate C delivered to the combustion chamber, of the static pressure $P_{s4}$ of the air at the exit from the compressor and of the static pressure $P_{s7}$ of the gases at the exit from the turbine, a first signal which is a function of the output quantity $\left[\frac{C}{\beta P_{s4}-P_{s7}}\right]$; means for producing a second signal or reference signal $\left[\frac{C}{\beta P_{s4}-P_{s7}}\right]^*$ which is a function of said desired predetermined value; means for producing a third signal or error signal which is a function of the difference $\left[\frac{C}{\beta P_{s4}-P_{s7}}\right]^* - \left[\frac{C}{\beta P_{s4}-P_{s7}}\right]$; and means sensitive to said error signal in order to control the variation in the cross-sectional area of the nozzle.

3. A control device as claimed in claim 2, wherein the means for generating the signal which is a function of the quantity $\left[\frac{C}{\beta P_{s4}-P_{s7}}\right]$ comprises a force balance system with a variable multiplication ratio, which is subjected to a first force as a function of the fuel flow rate C and to a second force as a function of the pressure difference ($\beta P_{s4}-P_{s7}$); and means for generating a signal which is a function of said multiplication ratio.

4. A control device as claimed in claim 2, also including a pilot-operable control lever, and wherein the reference signal generating means comprises means sensitive to the position of said lever.

5. A control device as claimed in claim 4, wherein said reference signal generating means also includes means sensitive to at least one other parameter of the power plant, in particular the total temperature of the air at the compressor intake.

6. A control device as claimed in claim 3, wherein the means sensitive to the error signal and designed to control the variation in the cross-sectional area of the nozzle, comprises means which are sensitive to the instantaneous position of said force balance system and means for modifying, as a function of said error signal, the multiplication ratio of said force balance system.

7. A control device for a gas turbine power plant of the type comprising a compressor, a combustion chamber supplied with air coming from the compressor and with fuel, a turbine supplied with combustion gases coming from the combustion chamber, and a nozzle for discharging the combustion gases coming from the turbine, said device comprising:

means for regulating the fuel flow to the combustion chamber;

means for varying the cross-sectional area of the nozzle;

means for controlling the nozzle cross-sectional area varying means as a function of the fuel flow rate C delivered to the combustion chamber, the static air pressure $P_{s4}$ at exit from the compressor, and the static gas pressure $P_{s7}$ at the turbine exit, so that at least under certain conditions of operation, an output quantity defined by the expression $\frac{C}{\beta P_{s4}-P_{s7}}$, in which $\beta$ designates a constant coefficient of reduction, has a desired predetermined value; and a manual control system operable in an emergency for controlling the fuel flow regulating means.

8. A control device for a gas turbine power plant of the type comprising a compressor, a combustion chamber supplied with air coming from said compressor and with fuel, a turbine supplied with combustion gases coming from the combustion chamber, and a nozzle for discharging the combustion gases coming from said turbine, said control device comprising, in combination:

means for regulating the rate of fuel flow to the combustion chamber;

means operable to vary the cross-sectional area of the nozzle between maximum and minimum limits;

an automatic control system for operating said nozzle cross-sectional area varying means;

a normally inoperative manual control system for controlling the fuel flow regulating means;

means for activating said manual control system in the event of failure of the automatic system; and means operative in response to activation of said manual control system to operate said nozzle area control means to open the nozzle to its maximum limit, in order to maintain the temperature of the combustion gases at the turbine intake at a predetermined safe value.

9. A control device according to claim 8, wherein the means for activating the manual control system comprise a normally disengaged coupling between said manual control system and said means for regulating said fuel flow, and control means for engaging said coupling.

10. A control system according to claim 9, wherein said coupling is operated by fluid pressure, and said control means comprise a valve arranged between a source of pressurized fluid and said coupling and adapted in its open position to supply said coupling with said fluid.

11. A control system according to claim 10, wherein said means operative to open the nozzle to maximum limit comprise pressure sensitive means responsive to the pressure of said pressurized fluid downstream of said valve.

12. A control system according to claim 8, wherein the means for regulating the fuel flow rate to the combustion chamber is controlled as a function of the fuel flow-rate C delivered to said combustion chamber and of the static air pressure $P_{a_4}$ at the compressor exit, so that an output quantity defined by the ratio $\frac{C}{P_{a_4}}$ is maintained at a predetermined value; and wherein activation of said manual emergency control system modifies said value.

* * * * *